(12) United States Patent
Luisi et al.

(10) Patent No.: US 8,787,657 B2
(45) Date of Patent: Jul. 22, 2014

(54) METHOD AND APPARATUS FOR PREPARING IMAGE REPRESENTATIVE DATA

(71) Applicant: Cranial Technologies, Inc, Tempe, AZ (US)

(72) Inventors: Jerold N Luisi, Phoenix, AZ (US); Timothy R Littlefield, Phoenix, AZ (US)

(73) Assignee: Cranial Technologies, Inc., Tempe, AZ (US)

( * ) Notice: Subject to any disclaimer, the term of this patent is extended or adjusted under 35 U.S.C. 154(b) by 0 days.

(21) Appl. No.: 13/829,051

(22) Filed: Mar. 14, 2013

(65) Prior Publication Data

US 2013/0194262 A1    Aug. 1, 2013

Related U.S. Application Data

(62) Division of application No. 13/136,553, filed on Aug. 4, 2011, now Pat. No. 8,442,308.

(51) Int. Cl.
| | |
|---|---|
| *G06K 9/00* | (2006.01) |
| *G06T 15/00* | (2011.01) |
| *G06T 17/10* | (2006.01) |
| *G06T 19/00* | (2011.01) |
| *G06K 9/34* | (2006.01) |

(52) U.S. Cl.
CPC ............. *G06T 17/10* (2013.01); *G06T 2210/41* (2013.01); *G06T 19/00* (2013.01)
USPC .......................................... 382/154; 345/419

(58) Field of Classification Search
CPC ......... G06T 15/00; G06T 17/00; G06T 19/00; G06T 2219/00
USPC ......... 382/119, 154, 162, 164, 165, 167, 203, 382/254; 345/420, 426, 475, 589, 590, 951; 715/852, 853
See application file for complete search history.

(56) References Cited

U.S. PATENT DOCUMENTS

| | | | | |
|---|---|---|---|---|
| 6,148,093 | A * | 11/2000 | McConnell et al. | 382/119 |
| 7,966,197 | B2 * | 6/2011 | Bassez et al. | 705/3 |
| 8,674,998 | B1 * | 3/2014 | Schnitzer et al. | 345/475 |
| 2010/0231590 | A1 * | 9/2010 | Erceis et al. | 345/426 |
| 2013/0194262 | A1 * | 8/2013 | Luisi et al. | 345/420 |

* cited by examiner

*Primary Examiner* — Amir Alavi
(74) *Attorney, Agent, or Firm* — Donald J. Lenkszus

(57) ABSTRACT

Apparatus for processing a digital mesh representing a three-dimensional subject automatically filters out portions of a predetermined color to simplify further processing.

15 Claims, 9 Drawing Sheets

METHOD AND APPARATUS FOR PREPARING IMAGE REPRESENTATIVE DATA

RELATED APPLICATIONS

This application is a division of U.S. patent application Ser. No. 13/136,553 filed Aug. 4, 2011 now U.S. Pat. No. 8,442,308.

FIELD OF THE INVENTION

This invention pertains to a system and method operating on data representative of three-dimensional shapes, in general, and a system and method operating on data representative of three-dimensional head shapes, in particular.

BACKGROUND OF THE INVENTION

Cranial remodeling is utilized to correct for deformities in the head shapes of infants. Prior to the development of the Dynamic Orthotic Cranioplasty$^{SM}$ method of cranial remodeling by Cranial Technologies, Inc, the assignee of the present invention, the only viable approach for correction of cranial deformities was surgical correction of the shape of the cranium. Dynamic Orthotic Cranioplasty$^{SM}$ utilizes a treatment protocol in which the DOC BAND® cranial remodeling device is custom produced for each subject to be treated.

In the past, custom cranial remodeling devices were produced by first obtaining a full size and accurate cast of the actual head shape of each subject. This cast was then modified to produce a second or desired head shape model. The second or desired head shape model is used to form the cranial remodeling band for the infant. In the past, the second or desired shaped head shape model was obtained by manually modifying the first cast to form the desired shape model.

Cranial Technologies has maintained a "library" of the casts of the head casts of infant's deformed heads and the corresponding models of the desired corrected head shapes.

Cranial Technologies, Inc. continued its pioneering developments with its proprietary DSI® digital image capturing system and its Digital Surface Imaging® methodology for the time efficient and safe image capture of three-dimensional full head images.

More specifically, the DSI® digital image capturing system was utilized to capture DSI® digital data representative of digital images of each cast of a deformed head and each corresponding model of the corrected head shape and store the DSI® digital data for each digital image in first and second databases, respectively. The first and second databases were utilized to train a neural network.

Cranial Technologies developed a system that utilized these first and second databases to automatically produces digital data representative of a modified head shape from DSI® digital data representative of a deformed head. A processor is trained to operate on a new set of captured data for a first head shape to produce a corresponding modified head shape.

An improved Cranial Technologies system utilizes a first database comprising captured DSI® digital data representative of a deformed head captured directly from the subject and it is that digital data that is processed to generate data representative of the deformed head.

The systems developed by Cranial Technologies require manipulation of the captured data for a variety of reasons.

The captured data file of each subject is reoriented to a predetermined orientation. In addition, a portion of the DSI® image data file is selected for further use and portions that will not be utilized are eliminated.

The DSI® digital image capturing system and its Digital Surface Imaging® have proven to be highly effective and has set the standard for three-dimensional image capture. In capturing images of infant subjects, an adult typically holds the infant in an upright-seated position. The hands of the adult are placed on the infant on the chest and back of the infant to support the infant in an upright position. Because of the variation in sizes of the infants, the field of capture is selected such that the three-dimensional image typically includes at least the shoulder and chest of the infant and accordingly, the three-dimensional image includes the hands and sometimes the wrist and a portion of the adult supporting the infant in position.

However, it is only the head of the subject infant that is of significance in the manufacture of the corrective cranial remodeling device. The remainder of the digital three-dimensional image captured including the supporting hands is of no interest and the three-dimensional image processing must remove that portion of the image that is of no interest.

SUMMARY

In accordance with the principles of the invention, three-dimensional image processing includes color separation to advantageously simplify processing of each three-dimensional image data file.

In accordance with one aspect of the invention, a three-dimensional photographic image of the subject is obtained simultaneously with capturing a three-dimensional data image of the shape of the subject. The subject comprises at least one portion of a predetermined color. The predetermined color portion of the three-dimensional photographic image of the subject is utilized to identify a corresponding portion of the three-dimensional data image of the shape of the subject.

In accordance with one aspect of the invention, a method is provided that comprises the steps of: providing a first data file representative of the shape of a three-dimensional subject; providing a second data file comprising a three-dimensional digital photographic data file representative of the subject and corresponding to the first data file. The subject comprises a first portion having a predetermined color. The method further comprises utilizing the second data file to identify a first portion of the first data file corresponding to the portion having the predetermined color.

One embodiment of the method includes the step of separating the first data file first portion from the first data file.

Another embodiment of the method includes the step of processing said first data file without utilizing said first data file first portion.

An embodiment of the method comprises capturing first data for the first data file and second data for the second data file substantially simultaneously.

One embodiment of the method comprises: providing the first data file with data representative of a plurality of polygons arranged into a mesh representative of the subject; and utilizing a color selective algorithm to selectively identify a first color portion of the second data file corresponding to the predetermined color.

The method may further include the steps of: identifying data in the first data file representative the polygons corresponding to the first color portion of the second data file; processing the data representative of the polygons corresponding to the predetermined color in a first manner; and processing the data representative of the polygons not corresponding to the predetermined color criteria in a second manner different from the first manner.

The method may also include the step of modifying the first data file to eliminate data representative of the polygons corresponding to the first color portion.

In accordance with an embodiment, apparatus is provided that comprises a first data file representative of the shape of a three-dimensional subject and a second data file comprising a three-dimensional digital photographic data file representative of the subject and corresponding to the first data file. The subject comprises a first portion having a predetermined color. The apparatus further comprises a processor operable to utilize the second data file to identify a corresponding first portion of the first data file corresponding to the portion of the second data file having said predetermined color.

In one embodiment, the apparatus may be arranged such that the processor is operable to separate the first data file first portion from the first data file.

In one embodiment, the processor may be operable to process the first data file excluding the first data file first portion.

One embodiment of the apparatus comprises capture apparatus to capture first data for the first data file and second data for the second data file substantially simultaneously.

In an embodiment, the first data file comprises data representative of a plurality of polygons arranged into a mesh representative of the subject. The apparatus may comprise a color selective algorithm executed by said processor to selectively identify a first color portion of the second data file corresponding to the predetermined color.

In one embodiment, the processor is operable to identify data in the first data file representative of polygons corresponding to the first color portion of the second data file; and is operable to process the data representative of the polygons corresponding to the predetermined color in a first manner; and operable to process the data representative of the polygons not corresponding to the predetermined color in a second manner different from the first manner.

In one embodiment the processor may modify the first data file to eliminate data representative of said ones of said polygons corresponding to the first color portion.

In accordance with an embodiment of the invention, apparatus provides a three-dimensional image of a subject. The apparatus comprises a plurality of image capturing device groups. Each of the groups comprises a plurality of image-capturing devices in predetermined spatial relationship to each other to define a space. The plurality of image capturing device groups are positioned such that each group is positioned to capture a group of first images of a corresponding surface portion of the subject disposed within the defined space. Each group of first images captured by the corresponding image capturing device group captures a substantially different surface portion of the subject. Each group is disposed such that the totality of the surface of the subject within the defined space is captured. The subject comprises portions of a predetermined color. The apparatus is operable to process the first images to generate a three-dimensional image of the subject. Processor apparatus is operable to process the portions of predetermined color differently than portions of the three-dimensional image not being the predetermined color.

In accordance with one embodiment, the processor apparatus processes the three-dimensional image to filter or exclude the portions of predetermined color from the three-dimensional image.

In accordance with another embodiment of the invention, each of the image-capturing devices comprises an optical filter for filtering out the predetermined color.

One embodiment comprises a program executable by the processor for selectively removing all portions of the three-dimensional images that are of the predetermined color and the processor apparatus is operable to execute the program to process the three-dimensional image without the portions having the predetermined color.

In an embodiment the program comprises a color separation program executable by said processor apparatus. The processor apparatus executes the color separation program to process the three-dimensional image to exclude the portions of the predetermined color from the three-dimensional image.

Further in accordance with an embodiment the predetermined color is selected as one of a blue color and a green color.

In yet another embodiment the apparatus comprises a program algorithm executable by the processor apparatus. The processor apparatus executes the program algorithm to process the three-dimensional image to exclude said portions from said three-dimensional image.

Another embodiment comprises a data file representative of a three-dimensional subject, the subject comprising portions having a predetermined color, the data file comprises a plurality of polygons arranged into a mesh representative of the subject. The embodiment further comprises a processor for processing the data file with a color selective algorithm to selectively identify ones of the polygons meeting predetermined color criteria. The processor processes all of the polygons meeting the predetermined color criteria in a first manner; and processes all of the polygons not meeting the predetermined color criteria in a second manner different from said first manner.

The embodiment may comprise a modified data file comprising all of the polygons meeting the predetermined color criteria.

In an embodiment of a method to provide three-dimensional images of a subject, the method comprises: providing a plurality of image capturing device groups, each of the groups comprising a plurality of image-capturing devices in predetermined spatial relationship to each other defining a space; positioning the plurality of image capturing device group such that each group is positioned to capture a group of first images of a corresponding surface portion of the subject disposed within the space, each group of first images capturing a substantially different surface portion of the subject disposed within the space, each group being disposed such that the totality of the surface of the subject within said space is captured; providing the subject with one or more portions of a predetermined color; providing processor apparatus; utilizing the processor apparatus to process the first images to generate a three-dimensional image of the subject; and utilizing the processor apparatus to process the portions of the predetermined color differently than portions of the three-dimensional image not having the predetermined color.

A method embodiment may further comprise processing the three-dimensional image to exclude the portions of the predetermined color from the three-dimensional image.

A method embodiment may comprise providing a filter for filtering out the predetermined color.

A method embodiment may comprise operating the processor apparatus to process the three-dimensional image to produce the three-dimensional image without the portions having the predetermined color.

A method embodiment further comprises providing a program executable by the processor for selectively removing all portions of the three-dimensional image that are of a particular color.

One method embodiment further comprises providing a color separation program executable by the processor apparatus and executing the color separation program to process the three-dimensional image to exclude the portions of the predetermined color from the three-dimensional image.

Another method embodiment further comprises providing a program algorithm to process the first images; and executing the program algorithm to process the three-dimensional image to exclude the portions of the predetermined color from the three-dimensional image.

A further method embodiment comprises: providing a data file representative of a three-dimensional subject, the subject comprising portions having a predetermined color, the data file comprises a plurality of polygons arranged into a mesh representative of the subject; processing the data file with a color selective algorithm; utilizing the color selective algorithm to selectively identify ones of the polygons meeting predetermined color criteria; processing all of the polygons meeting the predetermined color criteria in a first manner; and processing all of the polygons not meeting the predetermined color criteria in a second manner different from said first manner.

The further method embodiment may comprise providing a modified data file comprising all of the polygons meeting the predetermined color criteria.

BRIEF DESCRIPTION OF THE DRAWING

The invention will be better understood from a reading of the following detailed description taken in conjunction with the drawing figures in which like designations are utilized to identify like elements, and in which.

DETAILED DESCRIPTION

U.S. Pat. No. 7,127,101 issued Oct. 24, 2006; U.S. Pat. No. 7,142,701 issued Nov. 28, 2006; U.S. Pat. No. 7,162,075 issued Jan. 9, 2007; U.S. Pat. No. 7,177,461 issued Feb. 13, 2007; U.S. Pat. No. 7,227,979 issued Jun. 5, 2007; U.S. Pat. No. 7,242,798 issued Jul. 10, 2007; U.S. Pat. No. 7,245,743 issued Jul. 17, 2007; U.S. Pat. No. 7,280,682 issued Oct. 9, 2007; and U.S. Pat. No. 7,305,369 issued Dec. 4, 2007 are all assigned to the assignee of the present application and the disclosures contained in each of the patents are expressly incorporated herein by reference.

U.S. patent application Ser. No. 12/383,198 filed Mar. 20, 2009 and published as Publication No. 2010/0239135A1 on Sep. 23, 2010; and Ser. No. 12/798,076 filed Mar. 29, 2010 and published as Publication No. 2010/0238273A1 published on Sep. 23, 2010 are all assigned to the assignee of the present application and the disclosures contained in each of the applications as published are expressly incorporated herein by reference.

The various embodiments of the invention advantageously utilize the DSI® image capturing system 100 shown in detail and described in the above-identified patent publications.

DSI® image capturing system 100 comprises a plurality of image capturing device groups. Each of the groups comprises a plurality of image-capturing devices in predetermined spatial relationship to each other to define a space. The plurality of image capturing device groups are positioned such that each group is positioned to capture a group of first images of a corresponding surface portion of the subject disposed within the defined space. Each group of first images captured by the corresponding image capturing device group captures a substantially different surface portion of the subject. Each group is disposed such that the totality of the surface of the subject within the defined space is captured.

DSI® image capturing system 100 processes the captured images to produce a first data file that represents the three-dimensional surface of the subject within the defined space. In addition, DSI® image capturing system 100 simultaneously captures and provides a corresponding three-dimensional photographic image of the subject as a second data file.

Figure 1:
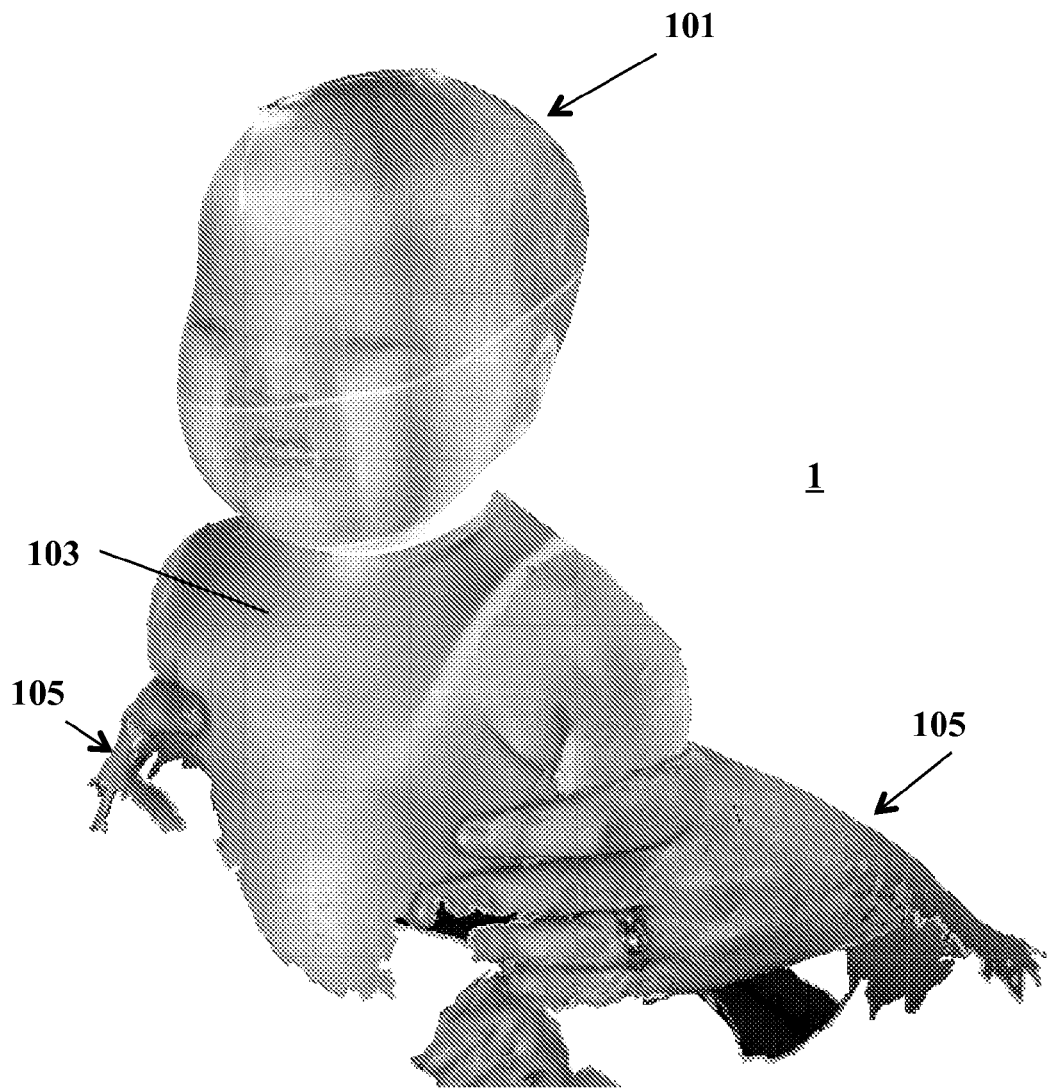
FIG. 1 illustrates a representative three-dimensional image with photographic overlay of a subject.
Figure 2:
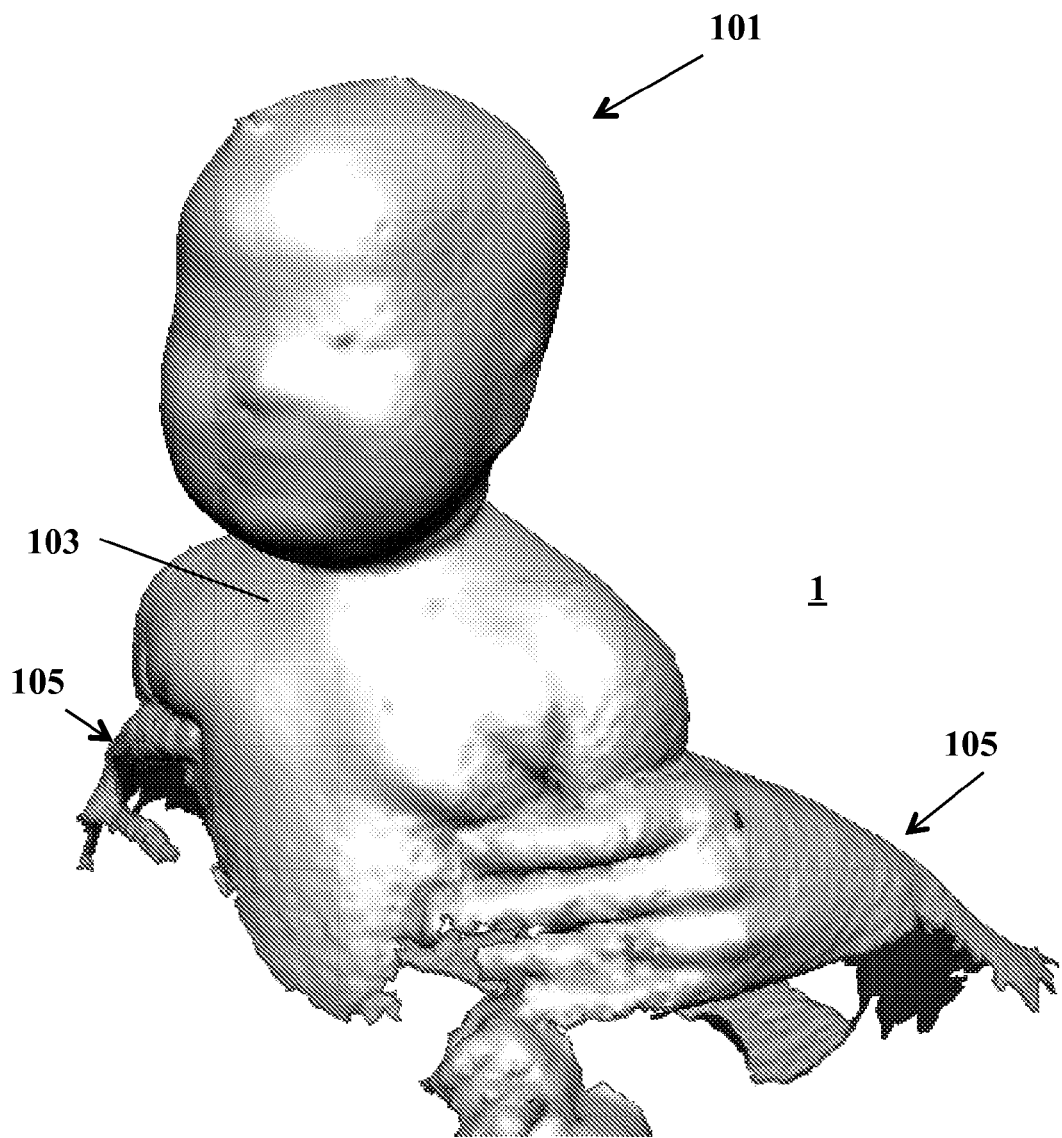
FIG. 2 illustrates the three-dimensional image of FIG. 1 without the photographic overlay.

FIG. 1 shows an operator viewed image 1 of a first DSI® data file representing a three-dimensional surface captured from a live subject along with photographic image overlay from the second data file. FIG. 2 illustrates a viewed image of three-dimensional DSI® data file 10 representing a three-dimensional surface without photographic overlay. As is apparent from FIGS. 1 and 2, the captured three-dimensional first DSI® data file and the corresponding photographic image of the second DSI® photographic file includes not only the head 101, but the chest 103 of the subject and, in the image shown, the subject is held in position, the hands 105 of the holder of the subject.

Figure 3:
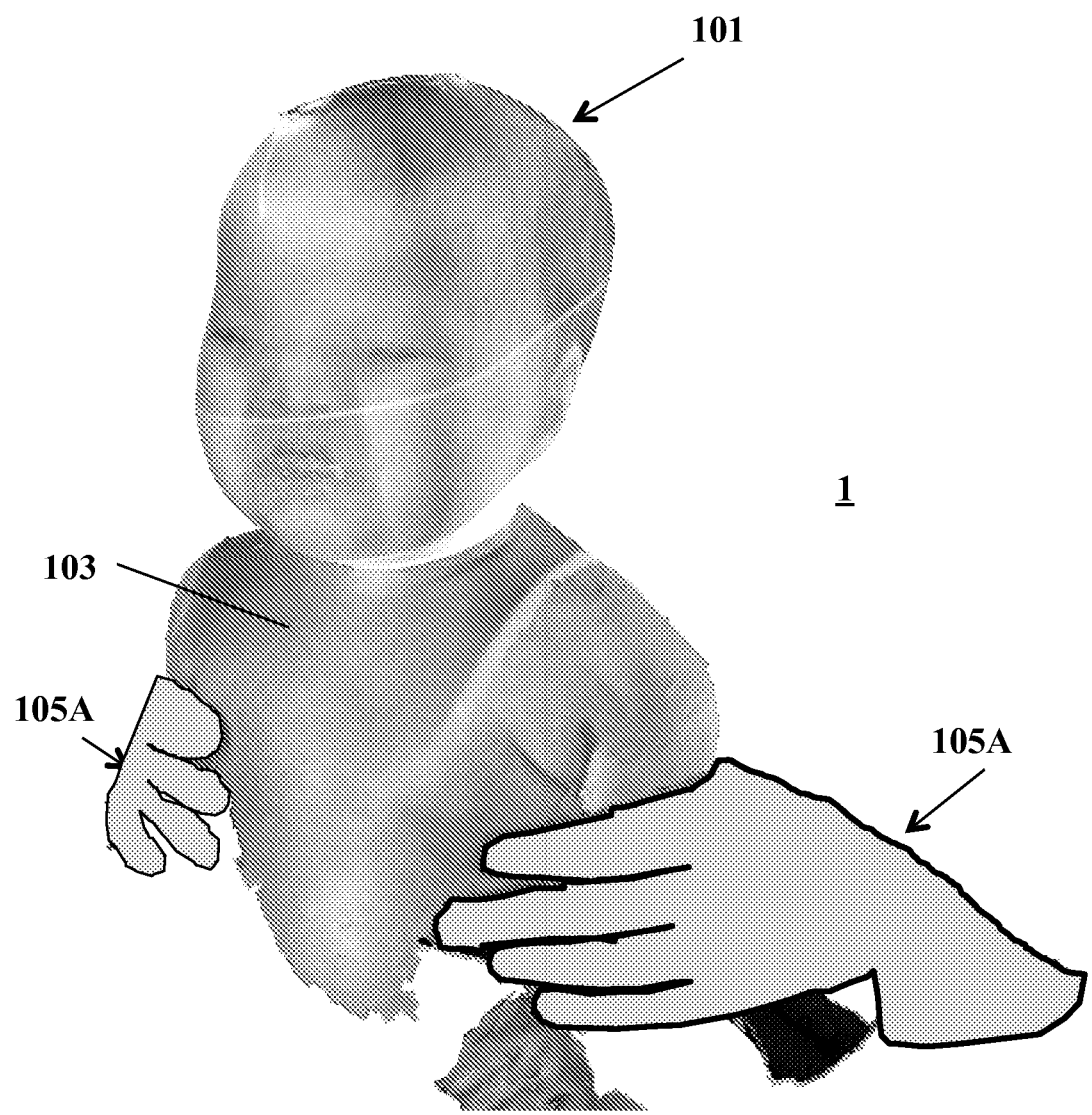
FIG. 3 illustrates the three-dimensional image of FIG. 1 with gloved hands.
Figure 4:
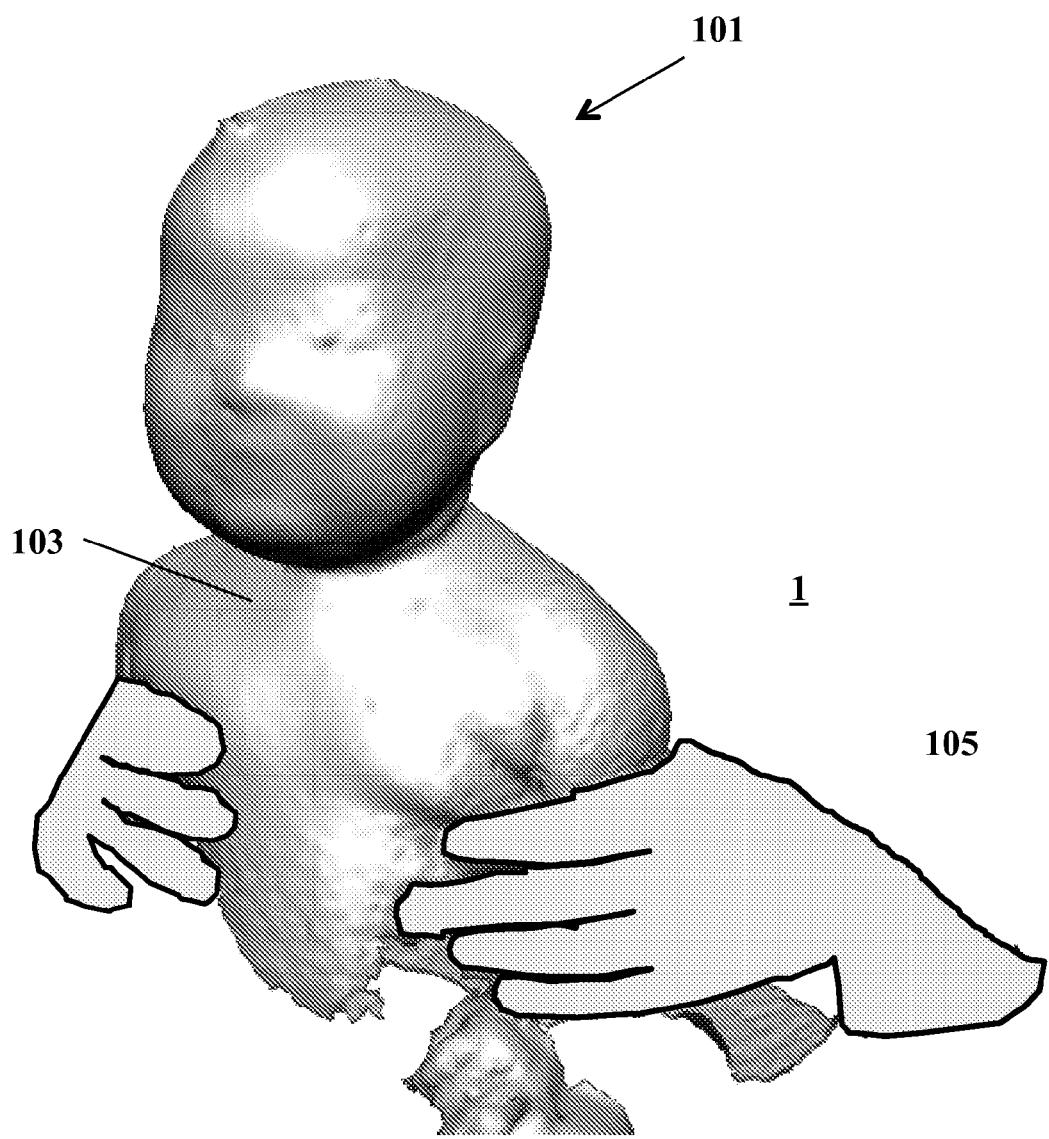
FIG. 4 illustrates the three-dimensional image of FIG. 2 with gloved hands.

In one embodiment as shown in FIG. 3 with photographic overlay and in FIG. 4 as a three-dimensional DSI® data file image without photographic overlay, hands 105 are gloved with gloves 105A that are of a predetermined particular color.

Typically gloves 105A are chosen to be a blue or green color, however in other embodiments the gloves may be of a different color such as pink.

Figure 5:
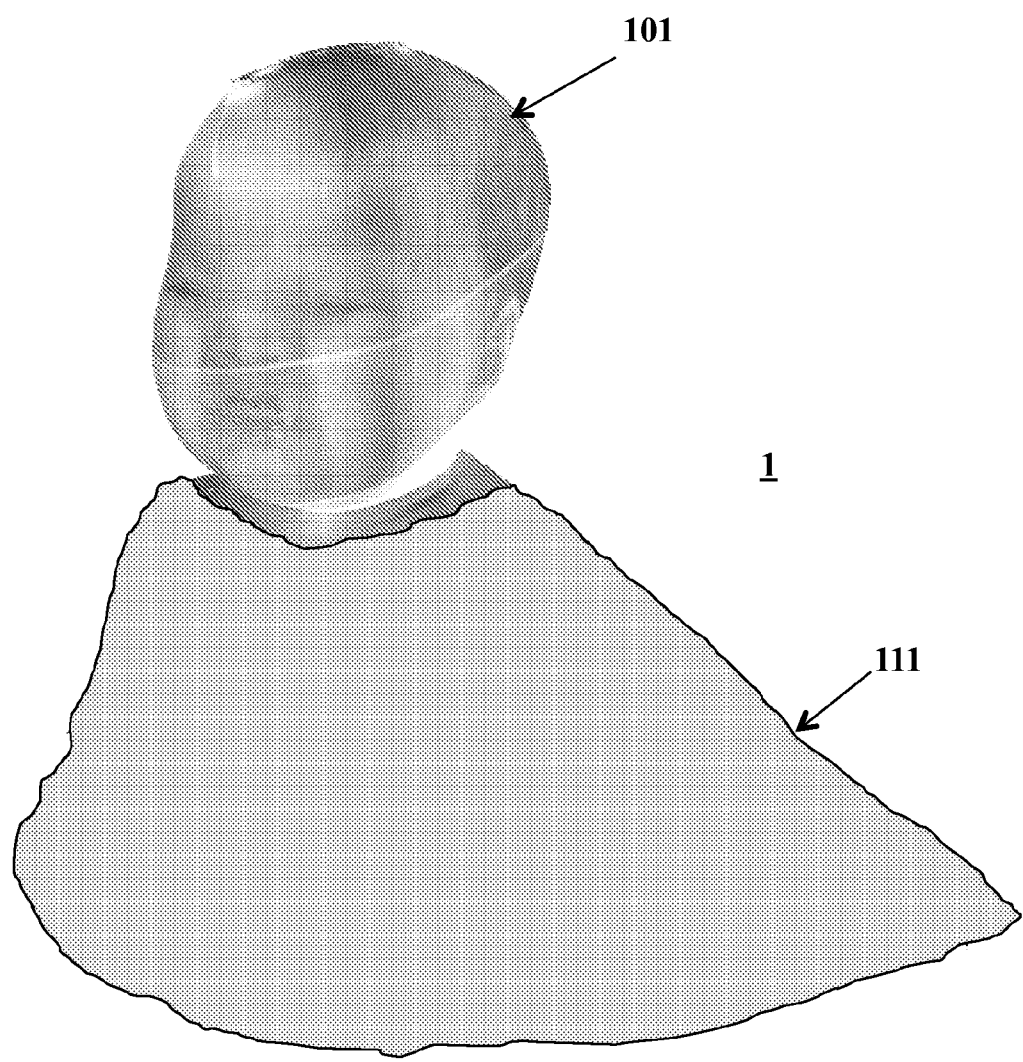
FIG. 5 illustrates a second representative three-dimensional image with photographic overlay of a subject and having a cape or gown.
Figure 6:
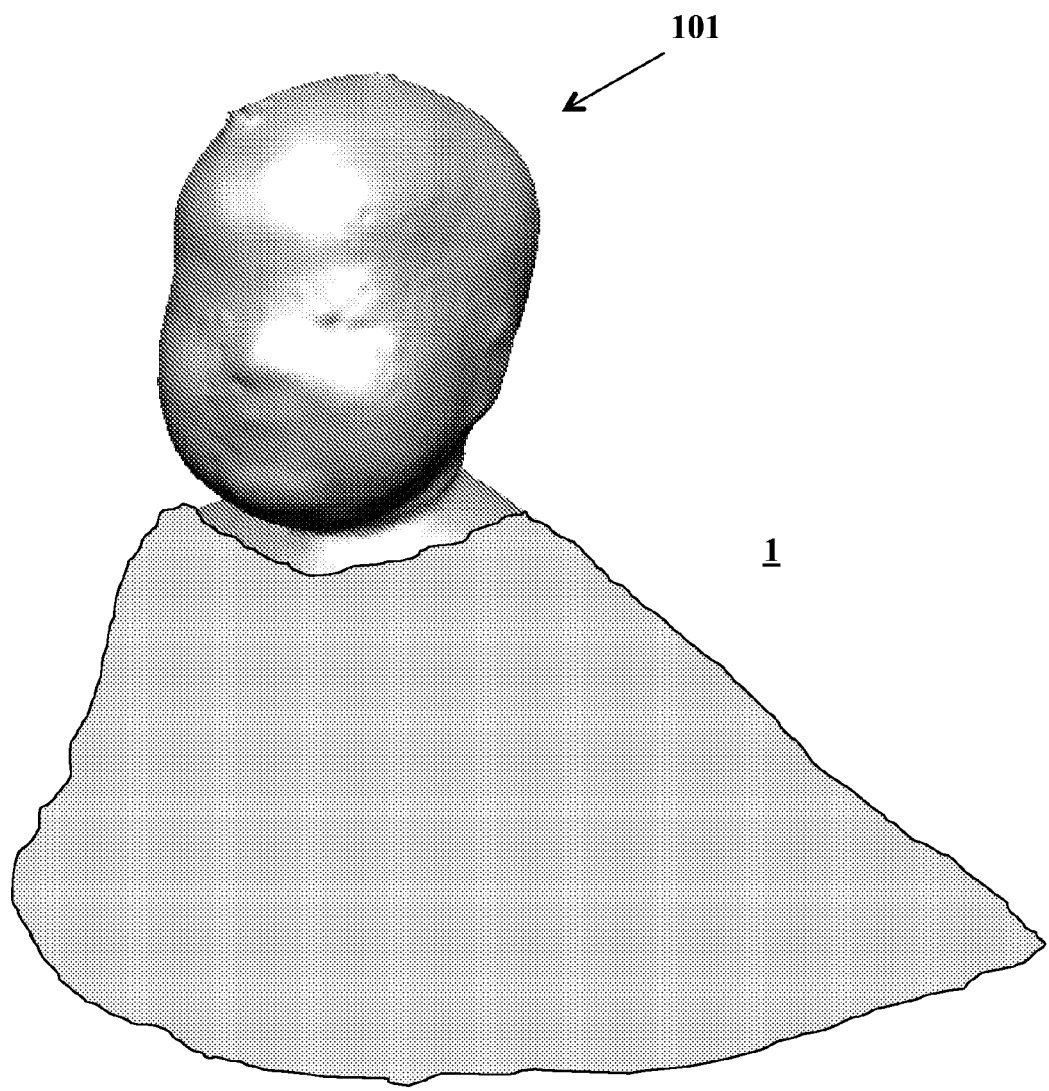
FIG. 6 illustrates the second representative three-dimensional image of FIG. 5 without the photographic overlay.

In another embodiment shown in FIG. 5 with photographic overlay and in FIG. 6 as a three-dimensional DSI® data file image without photographic overlay, a cape or gown 111 is draped over the shoulders of the subject and the hands 105 are covered. As with gloves 105A, cape or gown 111 is a predetermined particular color.

Typically, the color of cape or gown 111 is chosen to be a blue or green color, however in other embodiments may be of a different color such as pink.

Figure 7:
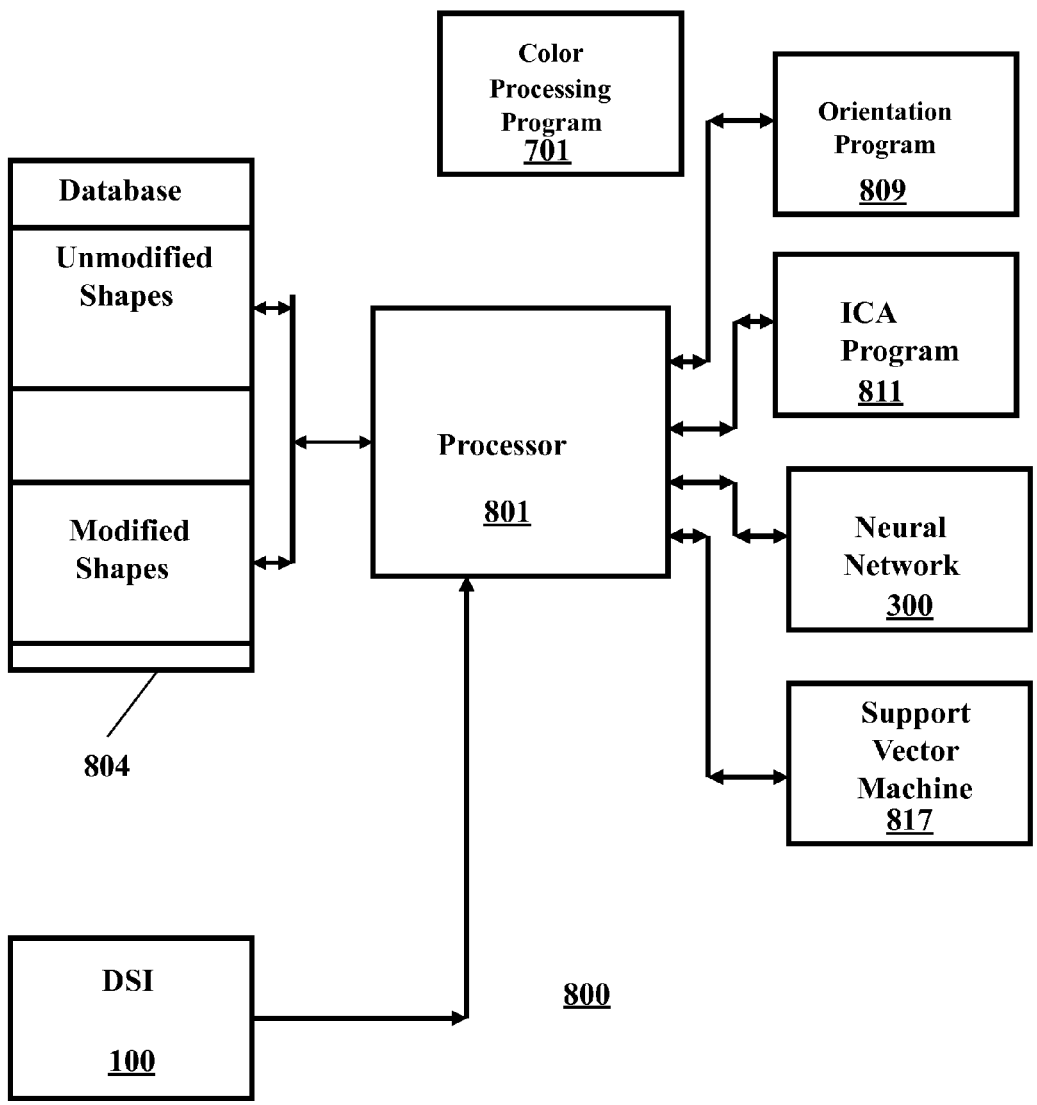
FIG. 7 illustrates a block diagram of a system.

System 800 shown in FIG. 7 operates on the three-dimensional DSI® data file of a subject obtained from DSI® system 100.

System 800 automatically processes three-dimensional DSI® digital data files representative of a subject head shape. System 800 comprises a database library 804 of a first plurality of three-dimensional DSI® digital data file representations of subject head shapes captured directly from live subjects, and a second plurality of second three-dimensional DSI® digital data files of corresponding modified head shapes produced by system 800.

System 800 includes processor 801 that further comprises a support vector machine application 817. Database library 804 is used to provide the plurality of said first and second digital image representation to processor 801 to train support vector machine 817 to operate on new three-dimensional DSI® digital data files.

The operation of System 800 with orientation program 809, ICA program, and neural network 300 is explained in detail in the aforementioned patents and patent applications and the entirety of the disclosures of those patents and patent applications are incorporated herein by reference.

System 800 receives a new three-dimensional DSI® digital data file or DSI® mesh data file of a subject head shape from DSI® system 100. Support vector machine 817 operates on the DSI® mesh data file to generate a corresponding second new three-dimensional DSI® digital data file or DSI® mesh data file replicating a corresponding modified head shape and stores each new three-dimensional DSI® digital data file or DSI® mesh data file and the corresponding new second three-dimensional DSI® digital data file or DSI® mesh data file in database 804.

Processor 801 then operates on each new three-dimensional DSI® digital data file or DSI® mesh data file to orient the new three-dimensional DSI® digital data file or DSI® mesh data file consistent with the three-dimensional DSI® digital data file or DSI® mesh data file information stored in database 804. After orienting, processor 801 processes the DSI® mesh to obtain a corresponding cranial mesh.

After obtaining a corresponding cranial mesh, system 800 further processes the cranial mesh to generate a new digital image representation or modified or second three-dimensional DSI® digital data file or DSI® mesh data file representative of a desired head shape.

System 800 updates database 804 by storing each new first three-dimensional DSI® digital data file or DSI® mesh data file in the database library 804 with the first plurality of first digital image representations and storing each corresponding new modified or second three-dimensional DSI® digital data file or DSI® mesh data file.

System 800 utilizes the updated database 804 to retrain support vector machine 817.

Further details of the operation of system 800 are described in the aforementioned US patents assigned to the assignee of the present invention.

In accordance with an embodiment of the invention, system 800 comprises a DSI® image capturing system. DSI® image capturing system 100 comprises a plurality of image capturing device groups. Each of the groups comprises a plurality of image-capturing devices in predetermined spatial relationship to each other to define a space. The plurality of image capturing device groups are positioned such that each group is positioned to capture a group of first images of a corresponding surface portion of the subject shown in FIG. 1 through FIG. 6 disposed within the defined space. Each group of first images captured by the corresponding image capturing device group captures a substantially different surface portion of the subject. Each group is disposed such that the totality of the surface of the subject within the defined space is captured. The first images are combined to generate a three-dimensional first DSI® data file of the subject.

In addition and as described above, DSI® image capturing system 100 also captures a three-dimensional DSI® photographic image or second data file of the subject simultaneous with capture of the first DSI® data file of the subject.

The three-dimensional DSI® photographic image data file 1 comprises portions 105A, 111 of a predetermined color. In the images shown in FIGS. 3 and 4 hands 105 are covered by gloves 105A that are of a selected predetermined color, for example, blue or green. In the images shown in FIGS. 5 and 6 the subject infant is covered with a gown or cape 111 that is of the selected predetermined color.

The predetermined color portion of the three-dimensional photographic image of the subject is utilized to identify a corresponding portion of the three-dimensional data image of the shape of the subject. Processor apparatus 801 is operable to process the DSI® photographic image data file and the first data file such that the DSI® photographic image data file predetermined color portions are used to identify corresponding portions of first data file.

In accordance with one embodiment, processor apparatus 801 processes each DSI® first data file to exclude the DSI® first data file portions corresponding to the predetermined color from the DSI® first data file to simplify further processing of the DSI® data file to produce a modified three-dimensional DSI® data file or DSI® mesh data file for further processing to produce a DSI® data file for a modified head shape.

More specifically, by processing three-dimensional DSI® first data file or DSI® mesh data file to exclude the corresponding portions of predetermined color, the data representative of gloves 105A or cape 111 shown in the drawing figures may be automatically removed for the data file.

In accordance with another embodiment of the invention, each of the image-capturing devices of DSI® system 100 comprises a filter for filtering out the predetermined color thereby eliminating the unwanted portions of predetermined color from the three-dimensional DSI® image file and/or three-dimensional DSI® digital data file or DSI® mesh data file as it is captured.

One embodiment comprises a program 701 executable by processor apparatus 801 for selectively removing all portions of the three-dimensional DSI® first data file that are identified by the corresponding three-dimensional DSI® second data file as being the predetermined color and processor apparatus 801 is operable to execute program 701 to process the three-dimensional DSI® first data file to filter out or exclude the first data file portions corresponding to the predetermined color.

In one embodiment, program 701 provides a computer algorithm executable by processor apparatus 801. Processor apparatus 801 executes the program algorithm to process each DSI® first data file to exclude or filter out the portions having the predetermined color in the three-dimensional DSI® second data file.

Program 701 may, for example, comprise a commercially available color separation program or a color selective program executable by processor apparatus 801. Processor apparatus 801 executes the color separation program to process the DSI® second data file to exclude or filter out the portions of the predetermined color to produce a new DSI® second data file and then to correlate the new DSI® second data file with the DSI® first data file to exclude or filter out the portions of the corresponding portions having the predetermined color in the three-dimensional DSI® second data file.

Each three-dimensional DSI® first data file or DSI® mesh data file comprises a plurality of polygons arranged into a mesh representative of the three-dimensional subject. Processor apparatus 801 executes the color selective algorithm of program 701 to process each DSI® first data file in conjunction with the corresponding DSI® second data file to selectively identify ones of the polygons meeting a predetermined color criteria. Processor apparatus 801 processes all of the polygons of each three-dimensional DSI® first data file or DSI® mesh data file meeting the predetermined color criteria in a first manner; and processes all of the polygons not meeting the predetermined color criteria in a second manner different from said first manner to produce a modified DSI® first data file comprising all of the polygons meeting the predetermined color criteria.

Figure 8:
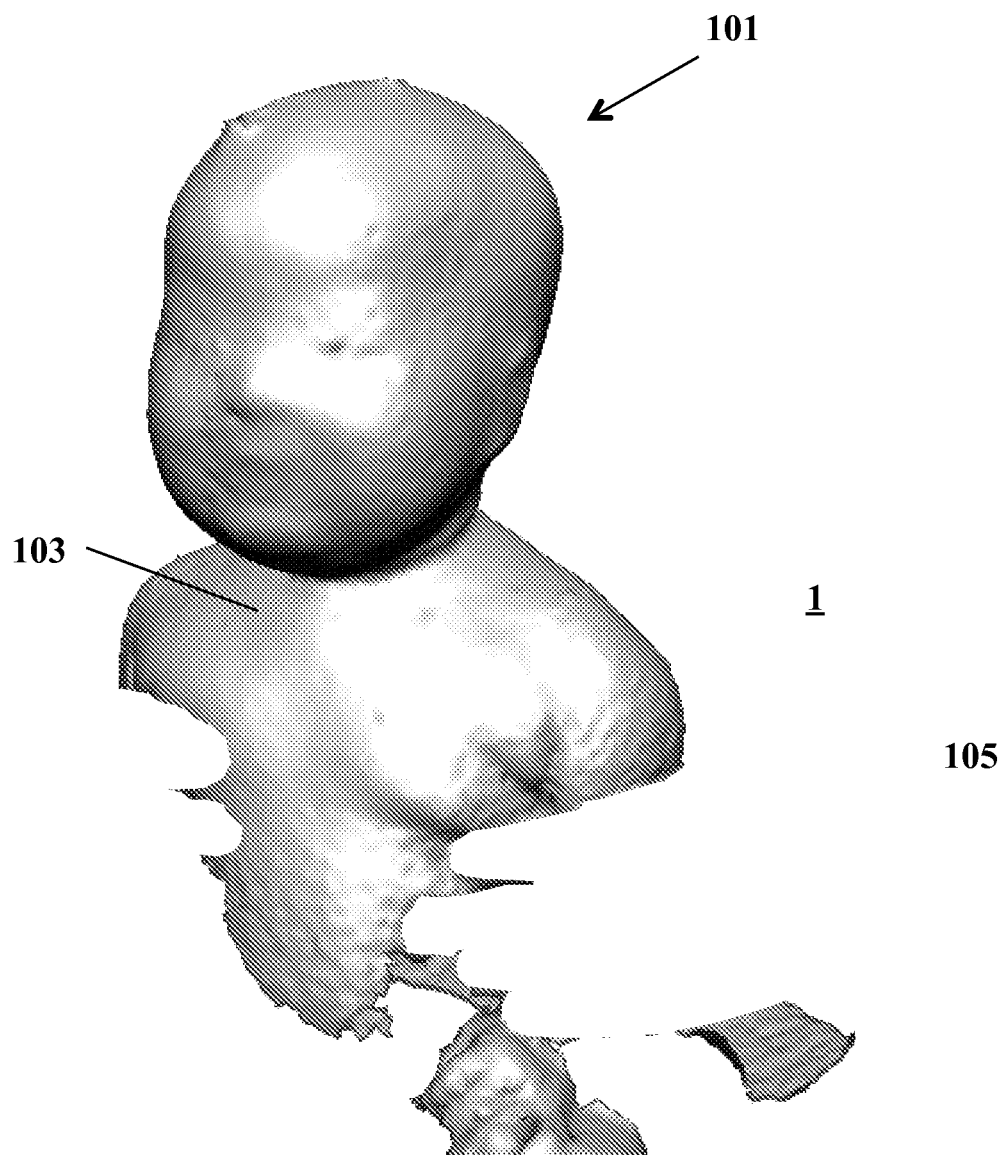
FIG. 8 illustrates the three-dimensional image of FIG. 4, processed to filter out the gloves.

After processing the three-dimensional DSI® first data file represented in FIG. 4, gloves 105A are removed resulting in a three-dimensional DSI® modified first data file representative of the image shown in FIG. 8.

Figure 9:
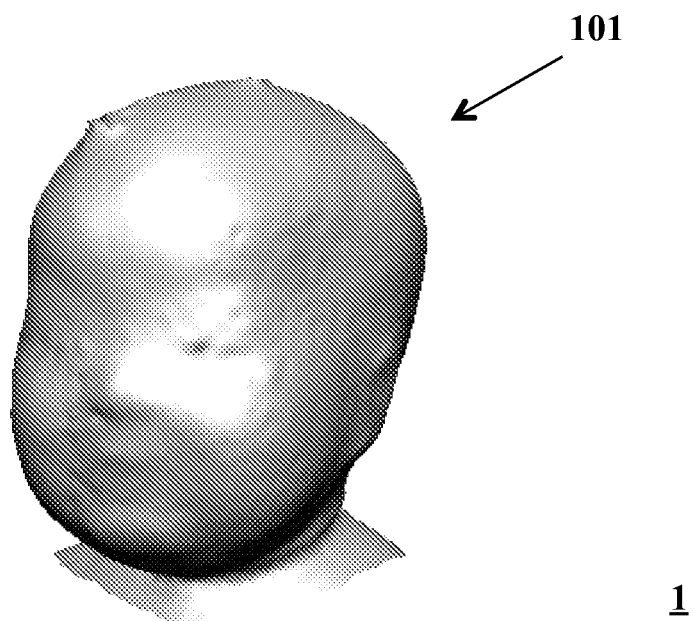
FIG. 9 illustrates the three-dimensional image of FIG. 6, processed to filter out the cape or gown.

After processing the three-dimensional DSI® first data file represented in FIG. 6, cape or gown 111 is removed resulting in a three-dimensional DSI® modified first data file representative of the image shown in FIG. 9.

After processing each three-dimensional DSI® first data file or DSI® mesh data file to remove the portions that are of the predetermined color, the resulting DSI® modified first data file is substantially simplified for further processing as described in the aforementioned patents and patent applications.

The invention has been described in terms of illustrative embodiments. It will be apparent to those skilled in the art that various changes and modifications can be made to the illustrative embodiments without departing from the spirit or scope of the invention. It is intended that the invention include all such changes and modifications. It is also intended that the invention not be limited to the illustrative embodiments shown and described. It is intended that the invention be limited only by the claims appended hereto.

The invention claimed is:

1. A method, comprising:
providing a first data file representative of the shape of a three-dimensional subject;
providing a second data file comprising a three-dimensional digital photographic data file representative of said subject and corresponding to said first data file, said subject comprising a first portion having a predetermined color; and
utilizing said second data file to identify a corresponding first portion of said first data file corresponding to said portion having said predetermined color;
providing said first data file with data representative of a plurality of polygons arranged into a mesh representative of said subject; and
utilizing a color selective algorithm to selectively identify a first color portion of said second data file corresponding to said predetermined color.

2. A method in accordance with claim 1, comprising:
separating said first data file first portion from said first data file to produce a modified first data file.

3. A method in accordance with claim 1, comprising:
processing said first data file without utilizing said first data file first portion to produce a modified first data file.

4. A method in accordance with claim 1, comprising:
capturing first data for said first data file and said second data file for said second data file substantially simultaneously.

5. A method in accordance with claim 1, comprising:
identifying data in said first data file representative of ones of said polygons corresponding to said first color portion of said second data file;
processing said data representative of said ones of said polygons corresponding to said predetermined color in a first manner; and
processing said data representative of said ones of said polygons not corresponding to said predetermined color criteria in a second manner different from said first manner.

6. A method in accordance with claim 1, comprising:
modifying said first data file to eliminate data representative of said ones of said polygons corresponding to said first color portion.

7. Apparatus, comprising:
a first data file representative of the shape of a three-dimensional subject;
a second data file comprising a three-dimensional digital photographic data file representative of said subject and corresponding to said first data file, said subject comprising a first portion having a predetermined color; and
a processor operable to utilize said second data file to identify a corresponding first portion of said first data file corresponding to said portion having said predetermined color;
said first data file comprises first data representative of a plurality of polygons arranged into a mesh representative of said subject; and
a color selective algorithm executed by said processor to selectively identify a first color portion of said second data file corresponding to said predetermined color.

8. Apparatus in accordance with claim 7, comprising:
said processor is operable to separate said first data file first portion from said first data file.

9. Apparatus in accordance with claim 7, comprising:
said processor is operable to process said first data file excluding said first data file first portion.

10. Apparatus in accordance with claim 7, comprising:
capture apparatus to capture first data for said first data file and second data for said second data file substantially simultaneously.

11. Apparatus in accordance with claim 7, comprising:
said processor is operable to identify data in said first data file representative of ones of said polygons corresponding to said first color portion of said second data file;
said processor processes said data representative of said ones of said polygons corresponding to said predetermined color in a first manner; and
said processor processes said data representative of said ones of said polygons not corresponding to said predetermined color criteria in a second manner different from said first manner.

12. Apparatus in accordance with claim 7, comprising:
said processor modifies said first data file to eliminate data representative of said ones of said polygons corresponding to said first color portion.

13. A method comprising:
providing a data file representative of a three-dimensional subject, said subject comprising portions having a predetermined color;
said data file comprising a plurality of polygons arranged into a mesh representative of said subject;
processing said data file with a color selective algorithm;
utilizing said color selective algorithm to selectively identify ones of said polygons meeting predetermined color criteria;
processing all of said polygons meeting said predetermined color criteria in a first manner; and
processing all of said polygons not meeting said predetermined color criteria in a second manner different from said first manner.

14. A method in accordance with claim 13, comprising:
providing a modified data file comprising all of said polygons meeting said predetermined color criteria.

15. A method in accordance with claim 13, comprising:
providing a modified data file comprising all of said polygons not having a preselected predetermined color.

* * * * *